United States Patent [19]

Burgess, Jr.

[11] Patent Number: 5,460,259
[45] Date of Patent: Oct. 24, 1995

[54] CONVEYOR SUPPORT APPARATUS FOR STRAIGHT-LINE MOTION

[75] Inventor: Ralph D. Burgess, Jr., Plymouth, Minn.

[73] Assignee: Food Engineering Corporation, Minneapolis, Minn.

[21] Appl. No.: 253,768

[22] Filed: Jun. 3, 1994

[51] Int. Cl.$^6$ .................................................. B65G 27/08
[52] U.S. Cl. ............................................. 198/764; 198/763
[58] Field of Search .................................. 198/752, 759, 198/763, 764

[56] References Cited

U.S. PATENT DOCUMENTS

| | | |
|---|---|---|
| 736,753 | 8/1903 | Marcus ............................... 198/763 X |
| 2,876,891 | 3/1959 | Long et al. . |
| 2,895,064 | 7/1959 | Hoff et al. . |
| 2,951,581 | 9/1960 | Long et al. . |
| 2,997,158 | 8/1961 | Moskowitz et al. . |
| 3,053,379 | 9/1962 | Roder . |
| 3,087,602 | 4/1963 | Hinkle, Jr. . |
| 3,195,713 | 7/1965 | Morris et al. . |
| 3,209,894 | 10/1965 | Baechli . |
| 3,327,832 | 6/1967 | Kyle . |
| 3,348,664 | 10/1967 | Renner . |
| 3,358,815 | 12/1967 | Musschoot et al. . |
| 3,604,555 | 9/1971 | Couper . |
| 3,621,981 | 11/1971 | Nimmo . |
| 3,693,740 | 9/1972 | Lewis et al. . |
| 3,796,299 | 3/1974 | Musschoot . |
| 3,834,523 | 9/1974 | Evans . |
| 3,848,541 | 11/1974 | Hondzinski . |
| 3,877,585 | 4/1975 | Burgess, Jr. . |
| 3,882,996 | 5/1975 | Musschoot . |
| 4,162,778 | 7/1979 | Kraft . |
| 4,196,637 | 4/1980 | Barrot et al. . |

(List continued on next page.)

FOREIGN PATENT DOCUMENTS

| | | |
|---|---|---|
| 599119 | 5/1960 | Canada . |
| 606585 | 10/1960 | Canada . |
| 0028923 | 5/1925 | France ................................... 198/764 |
| 2727519 | 1/1978 | Germany ............................... 198/764 |
| 55-89118 | 7/1980 | Japan . |
| 55-140409 | 11/1980 | Japan . |
| 307950 | 9/1971 | U.S.S.R. . |
| 828219 | 2/1960 | United Kingdom . |

OTHER PUBLICATIONS

Albert, C. D., and F. S. Rogers, "Kinematics of Machinery," 1938, pp. 372–377.
Greenwood, Douglas C., "Engineering Data for Product Design," 1961, pp. 322–323.
Tao, D. C., "Applied Linkage Synthesis," 1964, p. 120.

Primary Examiner—James R. Bidwell
Attorney, Agent, or Firm—Schroeder & Siegfried

[57] ABSTRACT

A conveyor system with a support apparatus for maintaining non-pendular substantially straight-line motion of the material-conveying member thereof, wherein the support apparatus includes straight-line linkage which is mounted between a rigid supporting surface and the material-conveying member so as to restrict movement of the material-conveying member to a substantially straight-line non-pendular path parallel with the path of conveyance. Each straight-line linkage assembly which supports the material-conveying member includes a set of three linkage arms which are pivotally interconnected with resilient bushings that continually urge the linkage to a central neutral or resting position during movement thereof. Two of the linkage arms are pivotally connected in spaced relation at one end to a rigid support, and are each pivotally connected at their opposite end to a third intermediate linkage arm which is disposed therebetween. The third linkage arm, in turn, is pivotally connected to the material-conveying member in supporting relation, and the set of three linkage arms are constructed and positioned in such manner as to cause the material-conveying member to reciprocate in non-pendular motion along a substantially straight-line which is parallel to the path of conveyance when excited by vibrational forces along such path.

22 Claims, 8 Drawing Sheets

U.S. PATENT DOCUMENTS

| | | |
|---|---|---|
| 4,255,254 | 3/1981 | Faust et al. . |
| 4,260,051 | 4/1981 | Burghart . |
| 4,356,911 | 11/1982 | Brown . |
| 4,369,398 | 1/1983 | Lowry, Sr. . |
| 4,423,844 | 1/1984 | Sours et al. . |
| 4,482,046 | 11/1984 | Kraus . |
| 4,495,826 | 1/1985 | Musschoot . |
| 4,787,502 | 11/1988 | Sullivan . |
| 4,932,596 | 6/1990 | Sullivan . |
| 5,064,053 | 11/1991 | Baker . |
| 5,094,342 | 3/1992 | Kraus et al. . |
| 5,131,525 | 7/1992 | Musschoot . |

CONVEYOR SUPPORT APPARATUS FOR STRAIGHT-LINE MOTION

BACKGROUND OF THE INVENTION

The invention described and claimed herein is related generally to vibrating conveyors, and more specifically to vibrating conveyors which seek to minimize vibrational movement of the material-conveying member in a plane which is substantially normal to the path of conveyance.

For many years vibratory conveyors of various constructions have been used in manufacturing processes for particle displacement along a given path of conveyance. A typical conventional conveyor generally employs a material-conveying member which is vibrated at an angle relative to the path of conveyance, thereby introducing both horizontal and vertical vibrational components to the material-conveying member. Such horizontal and vertical vibrational forces effectively cause the material being conveyed to bounce along the path of conveyance from one end of the conveyor to the other.

It has long since been well recognized that vibrational forces generated normal to the path of conveyance (generally vertical components) are undesirable for a number of reasons. One such reason is that the bouncing nature of such conveyors makes it difficult for workers to handle the material which is being conveyed along the path of conveyance. Also, such normal components of force tend to damage delicate materials being conveyed, and cause a substantial amount of dust and other particles to become airborne, thereby creating an undesirable environment which the worker must endure.

In addition to the above disadvantages, conveyors of the conventional type which have significant vertical components of force normal to the path of conveyance can cause substantial damage to their supporting structures through repeated transmission of such vibrational forces thereto. With such conveyors typically reciprocating at well over 200 cycles per minute, the transmission of such vibrational forces to the supporting structure of the conveyor transmits vibrations of the structural support members, causing deterioration and possible failure of the joints therebetween. Moreover, the repeated impacts of the bouncing material within the material-conveying member causes substantial noise which contributes to the undesirable environment created by such conveyors. For a typical conveyor pan weighing 500 pounds and vibrating at 400 cycles per minute, a seemingly minor vertical vibrational displacement of 0.004 inches translates into approximately nine (9) pounds of cyclical vertical force being transmitted to the supporting structure. Such repeated vibratory forces may eventually cause substantial stresses and damage to the supporting structure.

Attempts have been made in the past to eliminate the numerous problems associated with such conventional conveyors by minimizing those components of vibratory force which are normal to the path of conveyance. For instance, one commercial device known as the SLIPSTICK conveyor, manufactured by Triple/S Dynamic's, Inc., utilizes symmetrically balanced rotating eccentric weights and a gear coupled drive mechanism to provide a horizontal differential drive motion which is substantially, if not completely, devoid of vertical vibrational components. Such horizontal differential motion is characterized by a slow-advance, quick return action which effectively glides the product down the material-conveying member without substantial vertical vibration.

Another known commercial device which employs a highly similar vibrational drive system is disclosed in U.S. Pat. No. 5,131,525, issued to Musschott on Jun. 21, 1992. Again, the drive system utilizes symmetrically balanced rotating eccentric weights to cause a horizontal differential motion which is substantially devoid of vertical vibrational components. The apparatus in the above patent, however, allows for variance of the position of the vibration generating means along the length of the material-conveying member so as to reduce horizontal vibratory forces which may occur in the material-conveying member.

Although the above known commercial devices have been somewhat effective in minimizing the generally vertical vibrational forces normal to the path of conveyance, such devices are deficient in that they ignore the effects of a very important source of such normal vibratory forces—the relative motion of the material-conveying member itself. If the material-conveying member is supported in such a manner that it is forced to oscillate through a pendular or arcuate motion, there will be a necessary and significant component of vibration normal to the path of conveyance, regardless of the direction of the vibratory force which is transmitted thereto. As stated previously, small vertical deflections can generate undesirable vertical forces.

As is the case in each of the above-described commercial devices, the material-conveying member is supported or suspended from its supporting surface by a pendulum-type supporting device which necessarily introduces a substantial vibrational force which is normal to the path of conveyance. Although the total stroke distance through which a typical conveyor operates is relatively short, as shown herein, the large mass of such conveyors, and the high speed at which they operate, makes the relative motion of the material-conveying member a significant factor which must be considered in attempting to eliminate undesirable vibrational forces which are normal to the path of conveyance.

As used herein and throughout the appended claims, the terms "pendulum" or "pendular," when used in reference to a conveyor supporting device, and the relative motion caused thereby in the material-conveying member of such a conveyor, means those supporting devices which utilize pendulum arms or leaf springs to support the material-conveying member, and the relative motion in which a material-conveying member is caused to move as a result of such pendulum arms or leaf springs.

Industries requiring conveyance of delicate materials have long since sought a solution to the above-mentioned problems which are incident to the use of conventional conveyors. A continuing search for quality and efficiency in producing competitive products throughout every industry has caused such industries to seek conveyors having improved conveyance characteristics. Through the use of our unique conveyor support mechanism described hereinbelow, we are now able to significantly reduce to negligible levels any vibrational components of force generally normal to the path of conveyance which are generated through the relative motion of the material-conveying member itself.

BRIEF SUMMARY OF THE INVENTION

As stated above, it is the principal object of the invention described herein to minimize to negligible levels any vibrational components of force which are generated by the relative motion of the material-conveying member in a direction generally normal to the path of conveyance.

It is a further object of the invention herein to provide substantially straight-line motion of the material-conveying member along the path of conveyance, with negligible deflection in a direction generally normal thereto, and to accomplish the same with an effective construction which is cost efficient and compact in size for maximum space utility.

To accomplish the above objectives, we have constructed a conveyor support apparatus which includes rigid straight-line linkage of relatively small compass which is mounted between a fixed rigid supporting surface and the elongated material-conveying member of the conveying system. Each straight-line linkage assembly which supports the material-conveying member is comprised of a set of three rigid linkage arms that are pivotally interconnected with each other, and further pivotally connected to the supporting structure and material-conveying member of the conveyor system.

Each set of rigid linkage arms includes a conveyor supporting linkage arm pivotally connected to the material-conveying member in supporting relation for pivotal movement about an axis transverse to the length of the conveyor and the path of conveyance defined thereby. The conveyor supporting linkage arm is disposed between a pair of outer control links which are pivotally connected to a common rigid supporting structure for pivotal movement about an axis parallel with the axis of pivot of the intermediate conveyor supporting linkage arm.

Each control link extends downwardly and inwardly from its pivotal connection with the common supporting structure to the intermediate conveyor supporting linkage arm, where it is pivotally connected to such arm for pivotal movement about an axis parallel with the axis of pivot thereof. Therefore, the control links of each linkage assembly converge angularly downward and inward from their respective points of pivotal connection with their common supporting structure to their pivotal connection with the conveyor supporting linkage arm.

The pivotal connections of the control links to the common supporting structure are spaced apart, as are the pivotal connections of such links to the conveyor supporting linkage arm. The line of spacing between the pivotal connections of the control links to the supporting structure, and the line of spacing between the pivotal connections of the control links to the conveyor supporting linkage arm, each extend along a plane which is substantially parallel to the longitudinal axis of the conveyor member and the path of conveyance defined thereby.

For best results, it has been found that the distance between the spaced pivotal connections of the control links to the intermediate conveyor supporting arm should be about fifty-three to fifty-four percent (53–54%) of the distance between the pivotal connections of the outer control links to the supporting structure therefor. Also, the length of each outer control link between its pivotal connection to the common supporting structure and its pivotal connection to the intermediate conveyor supporting arm should be approximately fifty-five to fifty-six percent (55–56%) of the distance between the spaced pivotal connections of the outer control links to their common supporting structure.

By constructing each linkage assembly in the manner described above, upon excitation of the material-conveying member through transmission of vibratory forces thereto along the direction of the path of conveyance, pivotal movement of each linkage arm will cause the material-conveying member to reciprocate in non-pendular motion along a straight-line plane of reciprocation parallel with the path of conveyance. Under the above circumstances, movement of the material-conveying member over an approximate one inch stroke along the straight-line plane of reciprocation will result in only about 0.0002 inch of displacement in a direction generally normal to the path of conveyance, which is virtually negligible and only about 5% of the corresponding displacement found in a conveyor system which employs a pendulum-type supporting system.

Each straight-line linkage assembly is constructed such that the lines of force transmitted through each of the control links by the weight of the material-conveying member has a restorative effect which continually urges the material-conveying member and straight-line linkage assembly toward a central neutral resting position of equilibrium. The effect of gravity returns each straight-line linkage assembly, and consequently the material-conveying member, to a common central position of rest when not being vibrated.

In addition, each pivotal connection of such a straight-line linkage assembly includes a resilient bushing which also continually urges the linkage system to a central neutral position of rest during movement thereof. Each resilient bushing includes a rigid inner sleeve and outer casing between which an elastomeric material is disposed. The elastomer is bonded to either both the inner sleeve and outer casing, or to the outer surface of the inner sleeve, with the outer casing securely clamped over the elastomer to provide resilient movement between the inner sleeve and outer casing.

Through the use of our new conveyor support apparatus, movement of the material-conveying member may be maintained along a straight-line plane of reciprocation which is parallel to the path of conveyance, with negligible deviation in directions generally normal thereto. As is demonstrated herein, use of our straight-line linkage in supporting a material-conveying member reduces such undesirable displacement of the material-conveying member to a negligible amount which is about twenty times (20x) less than that found when a conventional conveyor is employed using a pendulum-type supporting system. If the relative dimensions of the respective linkage arms in each straight-line linkage assembly are adhered to, the length of the controlling links and intermediate conveyor supporting linkage arm can be kept relatively short, thereby permitting the entire linkage assembly to be constructed in small compass so as to economize space utility and reduce the cost of manufacturing the same.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

Figure 1:
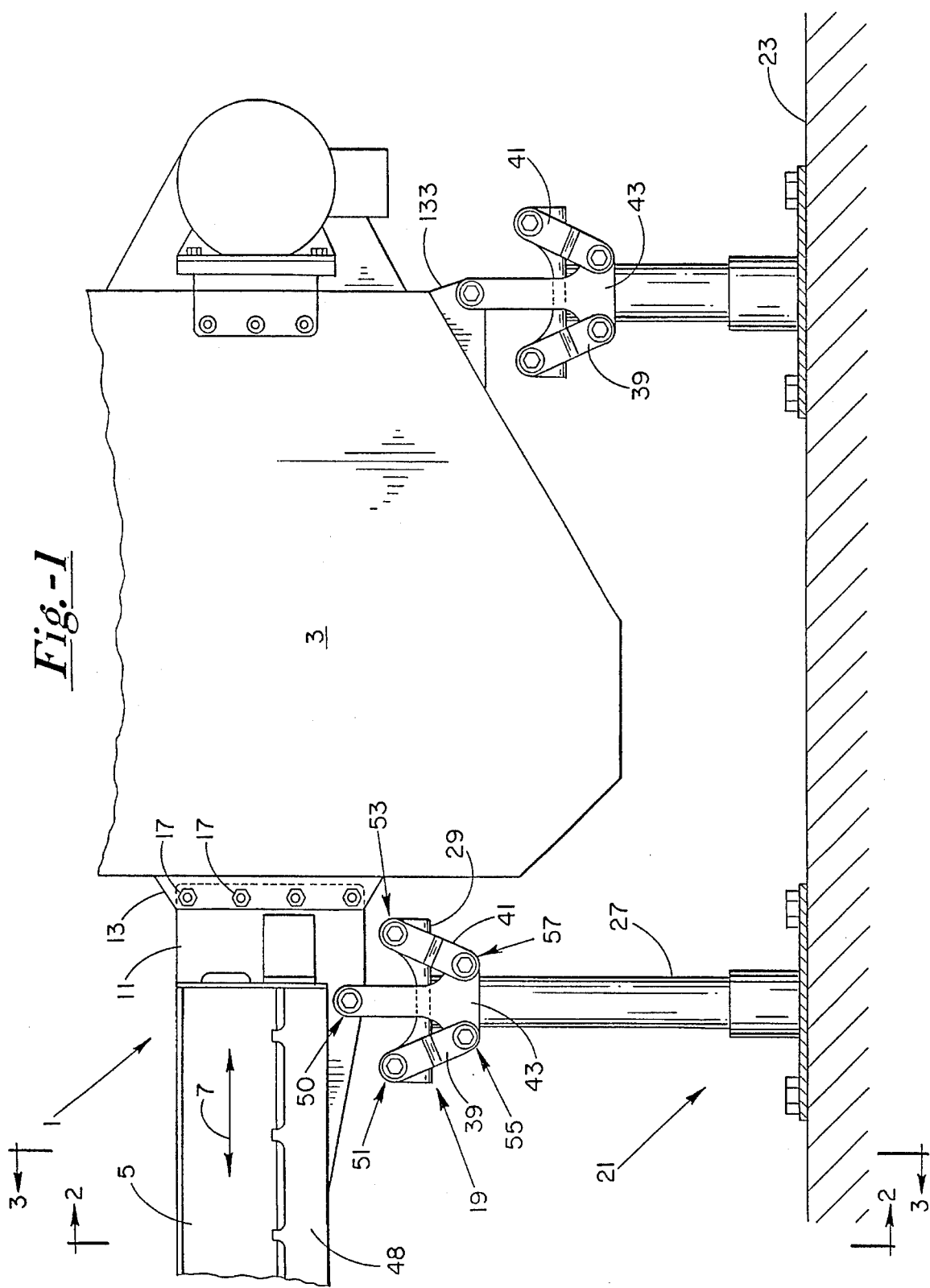
FIG. 1 is a partial side elevational view of a conveyor system wherein the material-conveying member thereof is supported underneath by our new straight-line linkage assembly.
Figure 2:
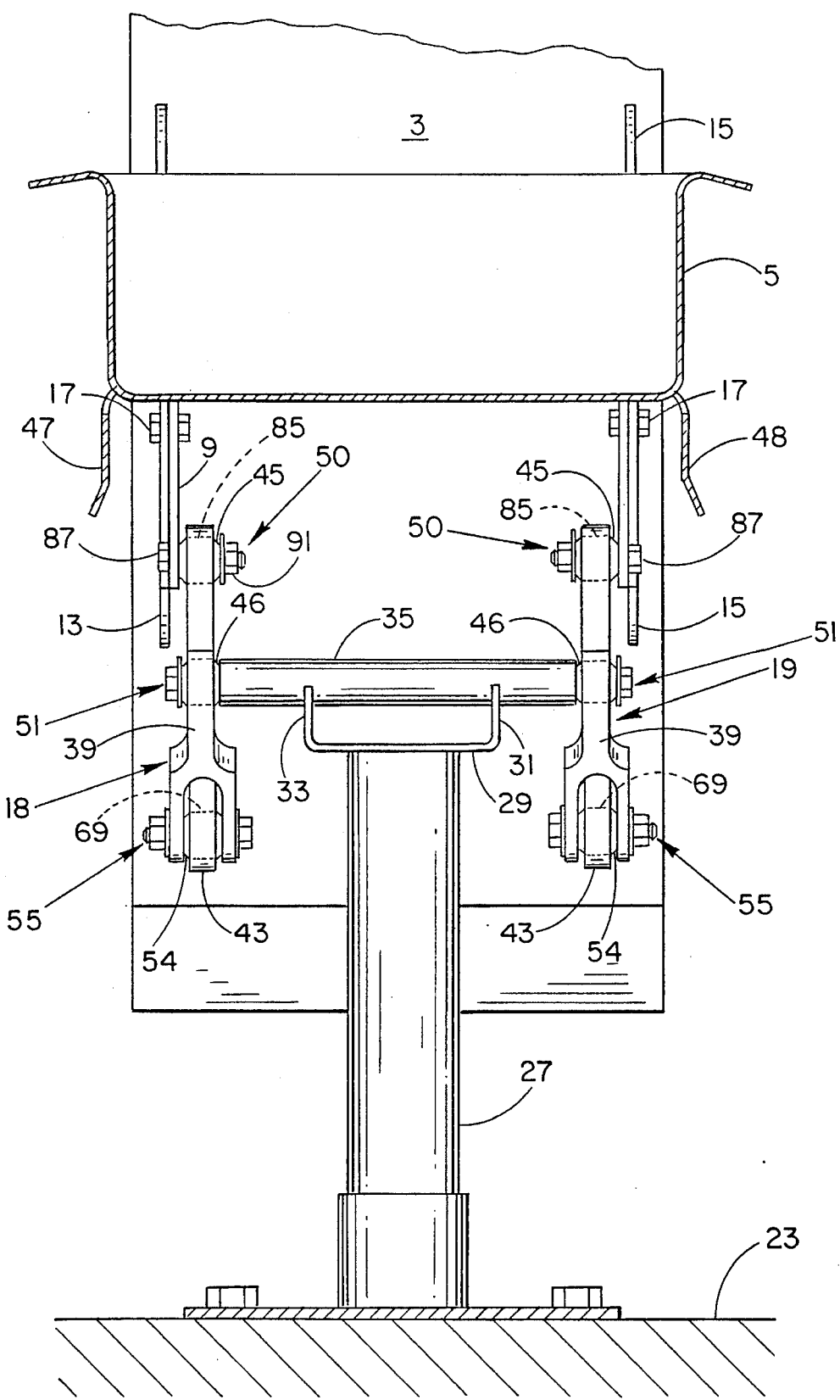
FIG. 2 is a vertical sectional view taken along lines 2—2 in FIG. 1, showing the construction and connection of our straight-line linkage assembly to the material-conveying member adjacent the drive end thereof.

With reference to FIGS. 1 and 2, there is shown a vibrating conveyor 1 having a vibration generating means 3 which transmits vibratory forces to an elongated material-conveying member 5 along a substantially straight-line path of conveyance designated by numeral 7. The material-conveying member 5 has rigid brackets 9 and 11 which extend rearwardly of the input end thereof and fixedly connect to plates 13 and 15, respectively, of the vibration generating means 3 via a plurality of rigid mounting bolts 17. Thus, vibratory forces generated by the vibration generating means 3 along the path of conveyance 7 are transmitted directly to the material-conveying member 5 of the conveying system.

Figure 5:
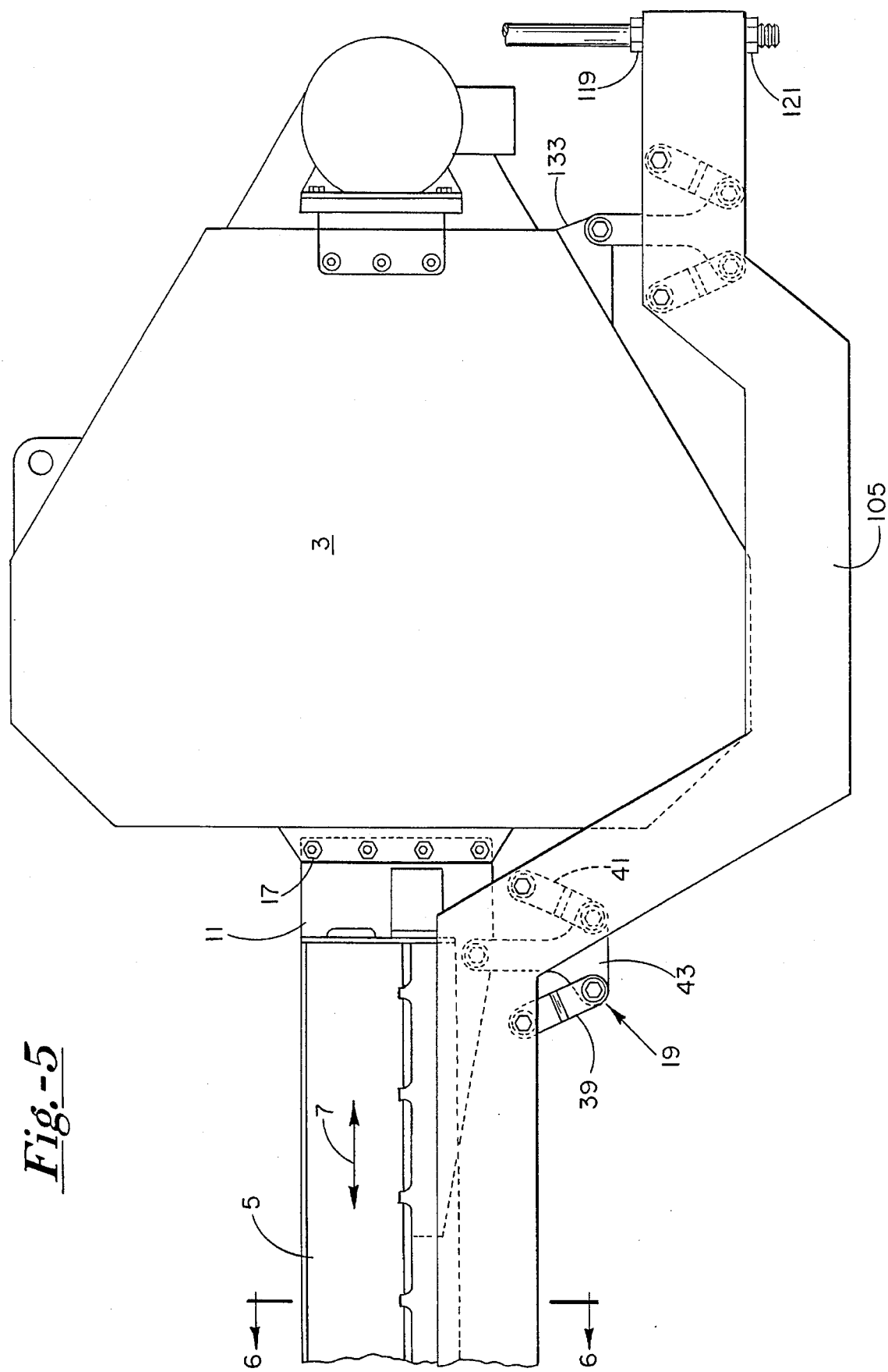
FIG. 5 is a partial side elevational view of a conveyor system having an overhead suspension system which utilizes our new straight-line linkage assembly to support and control the motion of the material-conveying member.

Opposing straight-line linkage assemblies 18 and 19, which are described in more detail hereinbelow, support the material-conveying member 5 from rigid supporting structure 21 which rests upon ground surface 23. The supporting structure 21 can be constructed in any suitable rigid manner, but it is preferably shown in FIG. 1 as a supporting pedestal 27 which is rigidly connected to ground surface 23 in upstanding relation. Generally, a plurality of such pedestals 27 and supporting straight-line linkage assemblies 18 and 19 will be positioned under the material-conveying member 5, throughout the length thereof, for greater support. Alternatively, as shown in FIG. 5, the straight-line linkage assemblies 18 and 19 may support the material-conveying member 5 from an overhead suspension system which secures to an overhead supporting structure, such as the ceiling of a manufacturing plant.

Rigidly connected to the upper end of supporting pedestal 27 is an elongated bracket 29 which is generally U-shaped in cross section with opposite upstanding legs 31 and 33 that are spaced laterally relative to the longitudinal axis of the material-conveying member 5. Bracket 29 supports a pair of linkage spacer shafts 35 (FIG. 2) and 36 (FIG. 3), which extend across opposite legs 31 and 33 of bracket 29 in a plane generally normal to the longitudinal axis of the material-conveying member 5. The pair of spacer shafts 35 and 36 are longitudinally spaced from one another on bracket 29, and each includes threaded mounting bores 37 at opposite ends thereof to facilitate the mounting of the opposed straight-line linkage assemblies 18 and 19 thereto. As opposing straight-line linkage assemblies 18 and 19 are connected to the opposite ends of spacer shafts 35 and 36 in the same manner, and constructed identically, it will be sufficient to describe the construction and function of only one such straight-line linkage assembly, with the understanding that each straight-line linkage assembly of conveyor system 1 is constructed and functions in the identical manner.

Figure 3:
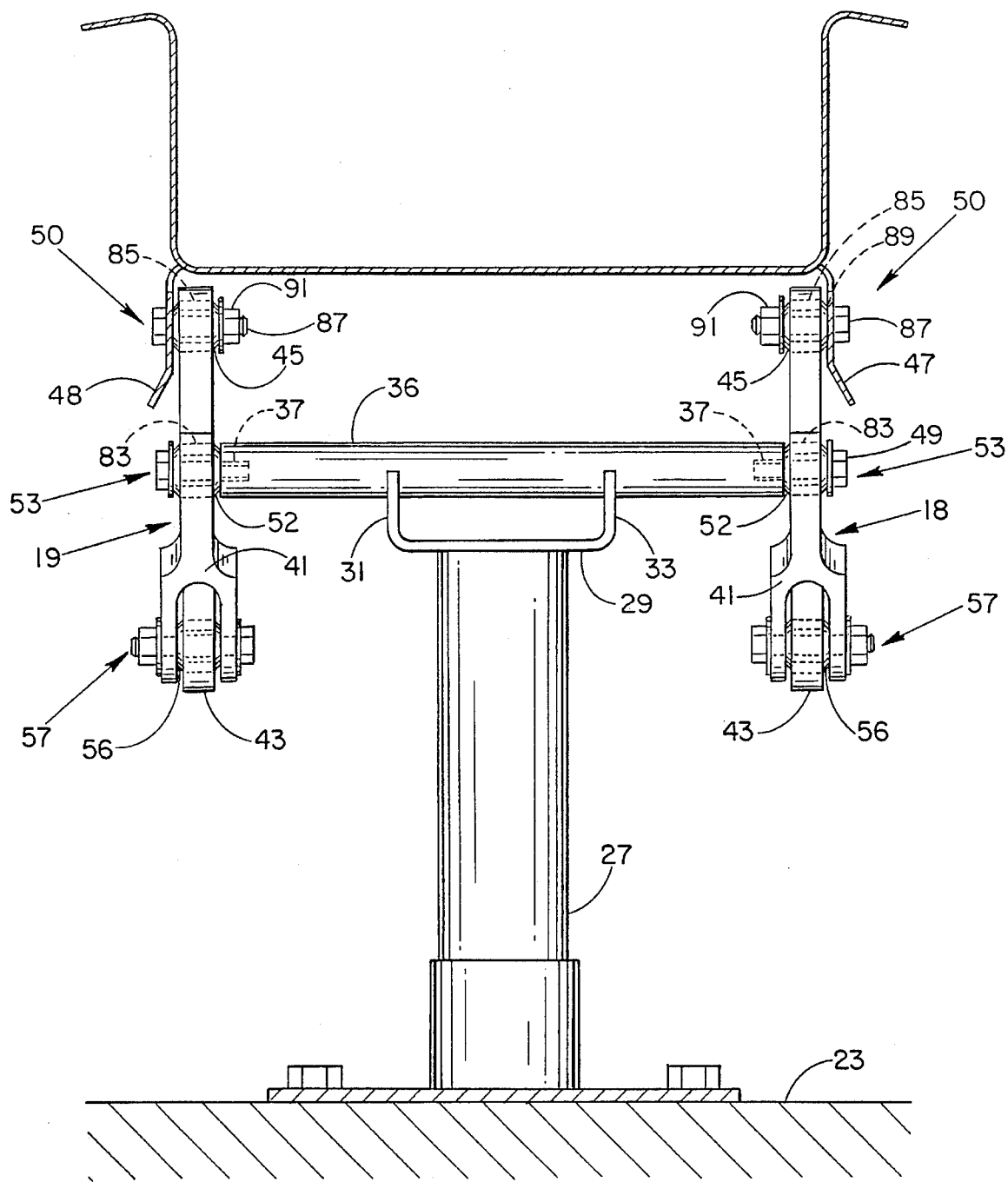
FIG. 3 is a vertical sectional view taken along line 3—3 of FIG. 1, showing the construction and connection of our straight-line linkage assembly to the material-conveying member at a point further along the length of the material-conveying member.

Straight-line linkage assembly 19 includes a set of rigid linkage arms which are comprised of a pair of outer control links 39 and 41 and an intermediate conveyor supporting linkage arm 43. Conveyor supporting linkage arm 43 extends between the outer control links 39 and 41, and the material-conveying member 5 of the conveyor system 1. As shown in FIGS. 1 and 2, near the vibration generating means 3, the supporting linkage arms 43 of opposing linkage assemblies 18 and 19 are bolted to brackets 9 and 11, respectively, in pivotal relation via the use of resilient bushings 45 (described in detail hereinbelow). As shown in FIG. 3, at various locations along the length of material-conveying member 5, the conveyor supporting linkage arms 43 of linkage assemblies 18 and 19 are bolted to rigid flanges 47 and 48, respectively, in pivotal relation via the use of additional resilient bushings 45. Rigid flanges 47 and 48 are connected to and depend from the opposite lower side edges of material-conveying member 5, and extend between the input and output ends of the material-conveying member 5 to facilitate pivotal connection of straight-line linkage assemblies along the length thereof.

The outer control links 39 and 41 of straight-line linkage assembly 19 are pivotally connected to one end of separate spacer shafts 35 and 36 via the use of resilient bushing 46 and 52, respectively. A bolt 49 extends through each bushing 46 and 52, and into threaded mounting bore 37 of the respective spacer shaft to which each is connected, thereby defining pivotal connections 51 and 53. Control links 39 and 41 extend downwardly and inwardly from their respective pivotal connections 51 and 53 to the conveyor supporting linkage arm 43 which is disposed therebetween. Control links 39 and 41 are pivotally connected to the conveyor supporting linkage arm 43 at separate spaced pivotal connections 55 and 57, respectively, via the use of similar resilient bushings 54 and 56. It is noted that the intermediate supporting linkage arm 43 has a generally inverted T shape so as to facilitate the spaced pivotal mounting of control links 39 and 41 thereto. As can be seen in FIG. 1, control links 39 and 41 are positioned and mounted to the rigid supporting structure 21 for pivotal movement at connections 51, 53, 55 and 57 about an axis parallel with the axis of pivot of the conveyor supporting linkage arm 43 at connection 50, which is transverse to the length of the material-conveyor member 5 and the path of conveyance 7 defined thereby.

Figure 4:
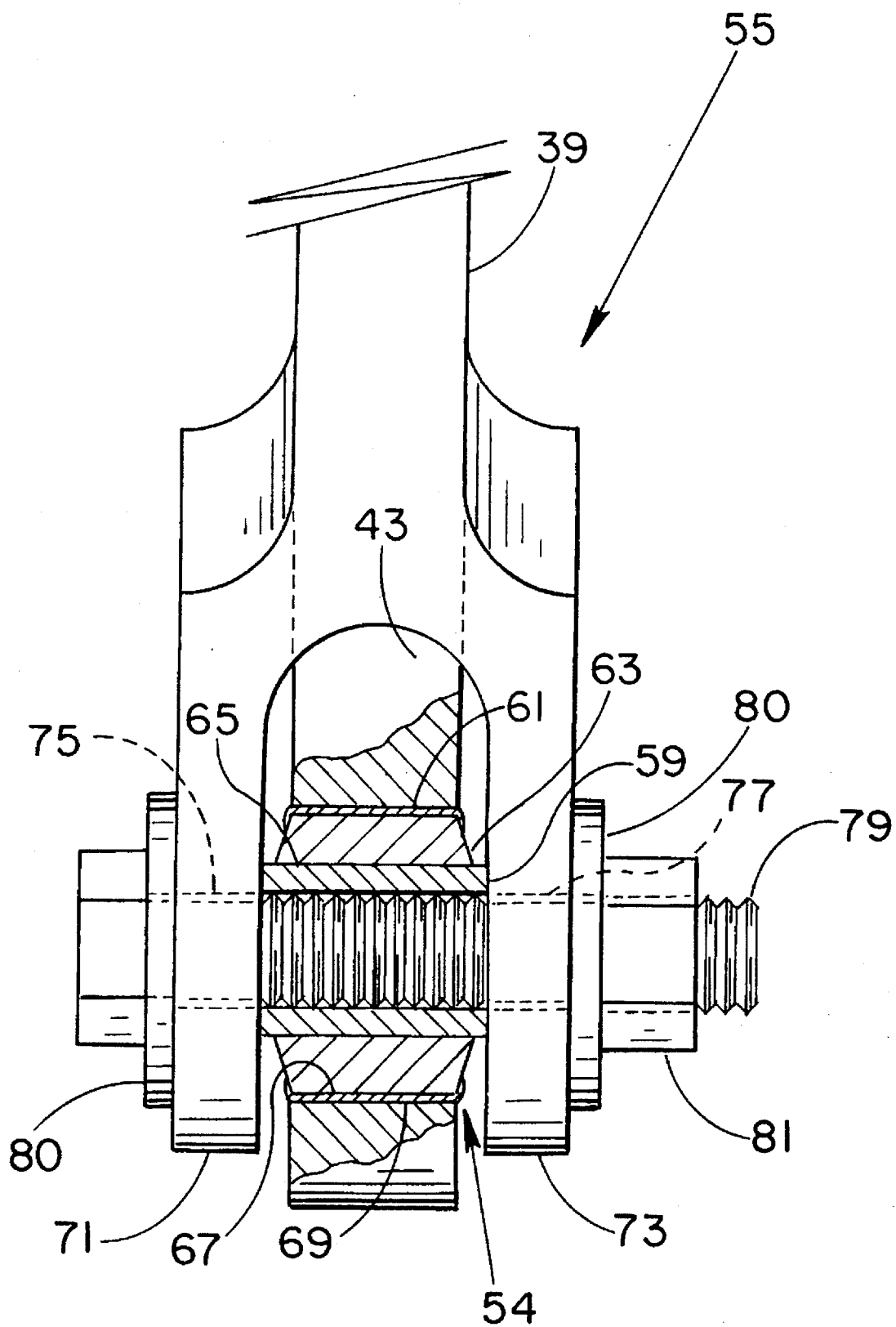
FIG. 4 is a partial sectional view of one of the pivotal connections of our straight-line linkage assemblies, showing the construction of the resilient bushing used in connection therewith.

With reference to FIG. 4, it is first noted that resilient bushings 45, 46, 52, 54 and 56 are all identically constructed. Each bushing is comprised of a rigid inner sleeve 59 and outer casing 61 between which a resilient elastomer 63 is disposed and permanently secured. The resilient elastomer 63 fills the entire space between the outer surface 65 of inner sleeve 59 and the inner surface 67 of outer casing 61, and is bonded to the outer surface 65 of inner sleeve 59. Casing 61 telescopes over the inner sleeve 59 and elastomer 63, and is clamped over elastomer 63 to secure the same in fixed relation between inner sleeve 59 and outer casing 61, thereby providing resilient movement therebetween. Alternatively, the elastomer 63 may be bonded to both the outer surface 65 of inner sleeve 59 and inner surface 67 of outer casing 61.

For illustration purposes, shown in FIG. 4 is the construction of pivotal joint 55 of linkage assembly 19. Since pivotal joint 57 is constructed in the identical manner as joint 55, only the construction of joint 55 will be described herein, it being understood that joint 57 is constructed in like manner. As can be seen, at joint 55, the conveyor supporting linkage arm 43 has an opening 69 into which resilient bushing 54 is press fit. The lower end of control link 39 is forked with opposite tines 71 and 73 having openings 75 and 77 (shown in phantom), respectively, extending therethrough. The lower forked end of control link 39 seats over resilient bushing 45, which is press fit into opening 69 of conveyor supporting linkage arm 43. Openings 75 and 77 in tines 71 and 73 align co-axially with the opening extending through inner sleeve 59, thereby providing a co-extensive opening through control link 39 and conveyor supporting linkage arm 43 through which a suitable bolt 79 may be received. Suitable washers 80 are used and nut 81 is threaded onto the end of bolt 79 to secure tines 71 and 73 of control link 39 firmly against inner sleeve 59 to prevent movement of the same relative to control link 39. With inner sleeve 59 held in fixed relation to control link 39, and outer sleeve 61 press fit in tight relation into opening 69 in conveyor supporting linkage arm 43, pivotal movement of joint 55 is caused by flexion of elastomer 63, which is sandwiched between the inner sleeve 59 and outer sleeve 61 of the resilient bushing 54.

With reference to pivotal connections 51 and 53 of linkage assembly 19, it is noted that such connections are identically constructed, the only difference being that control link 39 is pivotally connected to spacer shaft 35, whereas control link 41 is pivotally connected to spacer shaft 36. Therefore, the construction of pivotal connection 53, as disclosed in FIG. 3, will be discussed hereafter, with the understanding that pivotal connection 51 is constructed in like manner.

As shown best in FIG. 3, control link 41 has an opening 83 (shown in phantom) into which resilient bushing 52 is press fit. The opening extending through the inner sleeve 59 of resilient bushing 52 aligns in co-axial relation with threaded aperture 37 in one end of spacer shaft 36. To secure control link 41 to spacer shaft 36 in pivotal relation, bolt 49 extends through the inner sleeve 59 of resilient bushing 52, and threads into aperture 37 of spacer shaft 36. By tightening bolt 49, the inner sleeve 59 of resilient bushing 52 is clamped securely to the stationary spacer shaft 36. Because resilient bushing 52 is press fit in tight relation into opening 83 of control link 41, the outer sleeve 61 remains stationary, and pivotal movement at connection 53 is effected through flexion of the resilient elastomer 63, which is sandwiched between the inner sleeve 59 and outer sleeve 61 of resilient bushing 52.

As stated previously, pivotal connection 50 between the conveyor supporting linkage arm 43 of linkage assembly 19 and flange 48 of the material-conveying member 5 is also constructed with a resilient bushing 45, as described above. As shown best in FIG. 3, an aperture 85 (shown in phantom) extends through the upper end of conveyor supporting linkage arm 43, and has a resilient bushing 45 press fit therein. Bolt 87 extends through aperture 89 (shown in phantom) in flange 48 and through inner sleeve 59 of resilient bushing 45, where it receives on the opposite side a locking nut 91. By tightening nut 91, inner sleeve 59 of resilient bushing 45 is effectively clamped in fixed relation to flange 48. Because outer sleeve 61 is press fit into aperture 85 in tight fitting relation, pivotal movement of connection 50 is effected by flexion of the resilient elastomer 63 which is sandwiched between the inner sleeve 59 and outer sleeve 61 of the resilient bushing 45.

Straight-line linkage assembly 19 is constructed in such a manner that the weight of the material-conveying member 5 has a restorative effect which continually urges the material-conveying member 5 and straight-line linkage assembly 19 toward a central neutral resting position of equilibrium. The gravitational lines of force which extend through the control links 39 and 41 cause the straight-line linkage assembly 19, and consequently the material-conveying member 5, to return to its common central position of rest when vibration of the material-conveying member 5 ceases. The resilient nature of the elastomer 63 contained in each resilient bushing 45, 46, 52, 54 and 56 also tends to urge the straight-line linkage assembly 19 toward a neutral central resting position of equilibrium. Such resilient bushings, rather than conventional ball bearings, are used in each of the pivotal connections 50, 51, 53, 55 and 57, because they have been found to have a much greater ability to withstand the high frequency pivotal oscillation which such pivotal connections must endure during normal operation of a typical conveyor. Conventional ball bearings have been found to wear unevenly and deteriorate much faster than the above-described resilient bushings in applications involving such high speed oscillatory motions.

Figure 6:
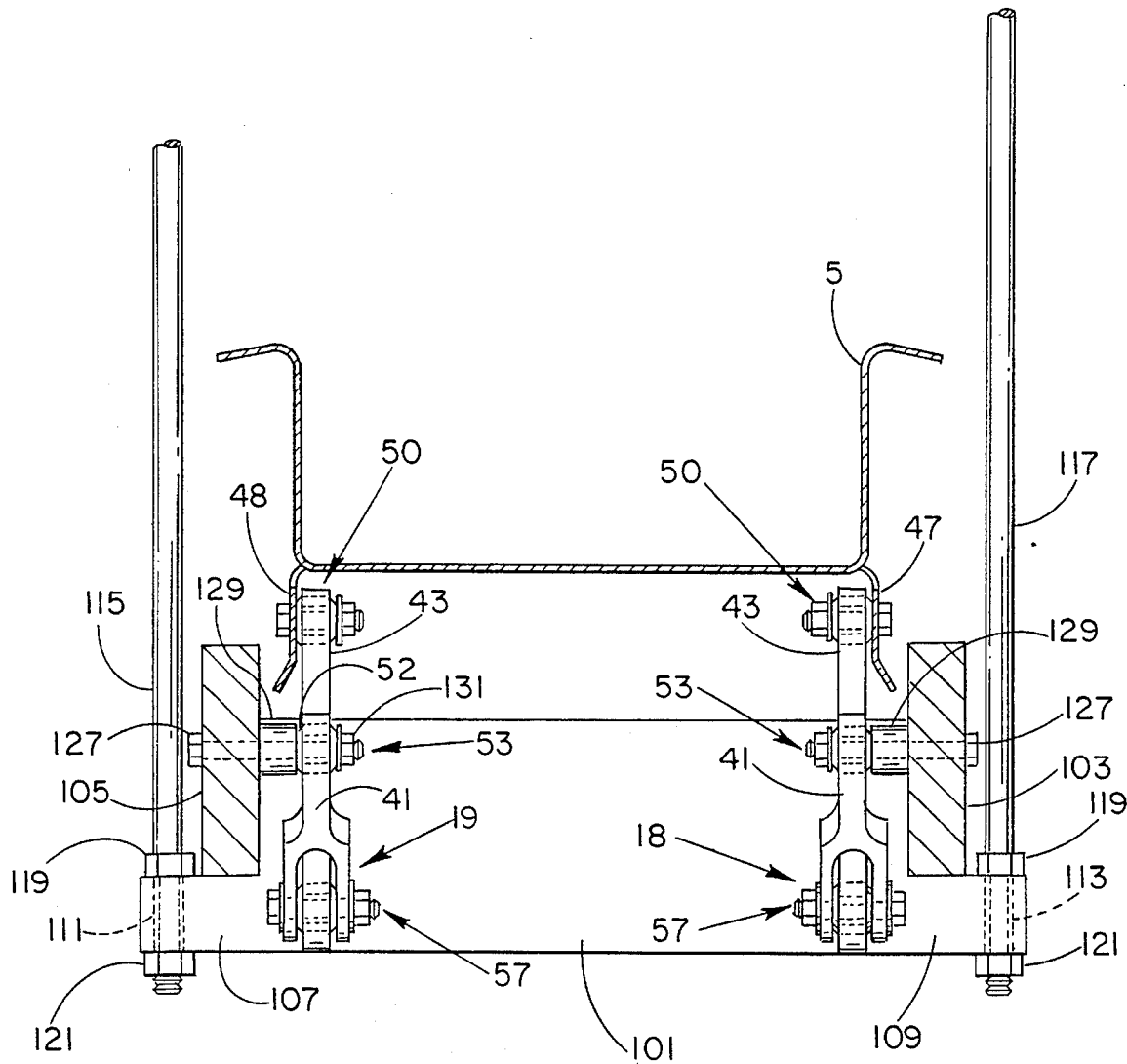
FIG. 6 is a vertical sectional view taken along line 6—6 of FIG. 5, showing how our straight-line linkage assembly connects to the overhead suspension system to control the movement of the material-conveying member along a straight-line plane of reciprocation.

With reference now to FIGS. 5 and 6 of the drawings, it can be seen that our straight-line linkage support system is equally well suited for use in connection with a conveyor system which is suspended from an overhead supporting structure (not shown), rather than from underneath, as shown in FIG. 1. As shown in FIGS. 5 and 6, identically constructed straight-line linkage assemblies 18 and 19, as described above, are mounted to a supporting frame 101 having opposite side walls 103 and 105. Frame 101 includes side legs 107 and 109 which extend outwardly beyond the outer confines of material-conveying member 5. Side legs 107 and 109 have apertures 111 and 113 (shown in phantom), respectively, through which rigid suspension rods 115 and 117 extend. Suspension rod 115 extends through aperture 111 in side leg 107, and is rigidly secured thereto via nuts 119 and 121, which are carried by suspension rod 115 above and below side leg 107, and tightened thereagainst. In a similar manner, extension rod 117 extends through aperture 113 in side leg 109, where it is secured by nuts 119 and 121. Suspension rods 115 and 117 extend upwardly from frame 101 and secure to an overhead supporting structure or ceiling (not shown). Of course, depending upon the length of the material-conveying member 5, a plurality of sets of suspension rods 115 and 117 may be utilized to support the conveyor system.

Each straight-line linkage assembly 18 and 19, being constructed as described above, connects to the material-conveying member 5 in the same manner as previously described. As shown in FIG. 5, at a location nearest to the vibration generating means 3, conveyor supporting linkage arm 43 of straight-line linkage assemblies 18 (not shown) and 19 are pivotally connected to rigid brackets 9 and 11 of material-conveying member 5 via the use of resilient bushings 45. Similarly, as shown in FIG. 6, at various other locations along the length of the material-conveying member 5, conveyor supporting linkage arm 43 of linkage assemblies 18 and 19 are pivotally connected to rigid flanges 47 and 48, respectively, in the same manner as described above in connection with the pedestal support system disclosed in FIG. 3.

The only difference in the mounting of the straight-line linkage assemblies 18 and 19 in the overhead suspension system is that frame 101 replaces pedestal 27, bracket 29 and spacer shafts 35 and 36. In the overhead suspension system, as shown in FIG. 6, control links 39 and 41 of linkage assembly 18 are secured in pivotal relation to side wall 103 of frame 101, and control links 39 and 41 of linkage assembly 19 are secured in pivotal relation to side wall 105 of frame 101. As each linkage assembly 18 and 19 is secured in pivotal relation to its respective side wall in the same manner, the connection of linkage assembly 19 to side wall 105 will be described hereafter, it being understood that linkage assembly 18 is connected to side wall 103 in the same manner.

As described previously, control links 39 and 41 of linkage assembly 19 carry resilient bushings 46 and 52, respectively. The opening through inner sleeve 59 of each resilient bushing 46 and 52 aligns with a corresponding opening in side wall 105, through which bolt 127 extends for threaded engagement with nut 131. A tubular spacer block 129 is disposed between side wall 105 and each of the control links 39 and 41, and tightening of nut 131 clamps the inner sleeve 59 of bushings 46 and 52 in fixed relation relative to side wall 105. As previously described, pivotal movement between control links 39 and 41, and side wall 105, is caused by flexion of the resilient elastomer 63 within resilient bushings 46 and 52 upon excitation of the material-conveying member 5.

With reference to both FIG. 1 and FIG. 5, it can be seen that a similar straight-line linkage assembly as that previously described is used to support and maintain substantially straight-line motion of the vibration generating means 3. In FIG. 5, a straight-line linkage assembly 19 is pivotally connected to bracket 133 of the vibration generating means 3, and pivotally connected to frame 101 in the same manner as described above. In FIG. 1, the straight-line linkage assembly 19 is shown as being supported by a similar pedestal support as previously described herein. In each case, the straight-line linkage assembly 19 is pivotally connected between the material-conveying member 5 and its respective supporting surface via interconnection thereto through supporting structure 21 or frame 101.

Figure 7:
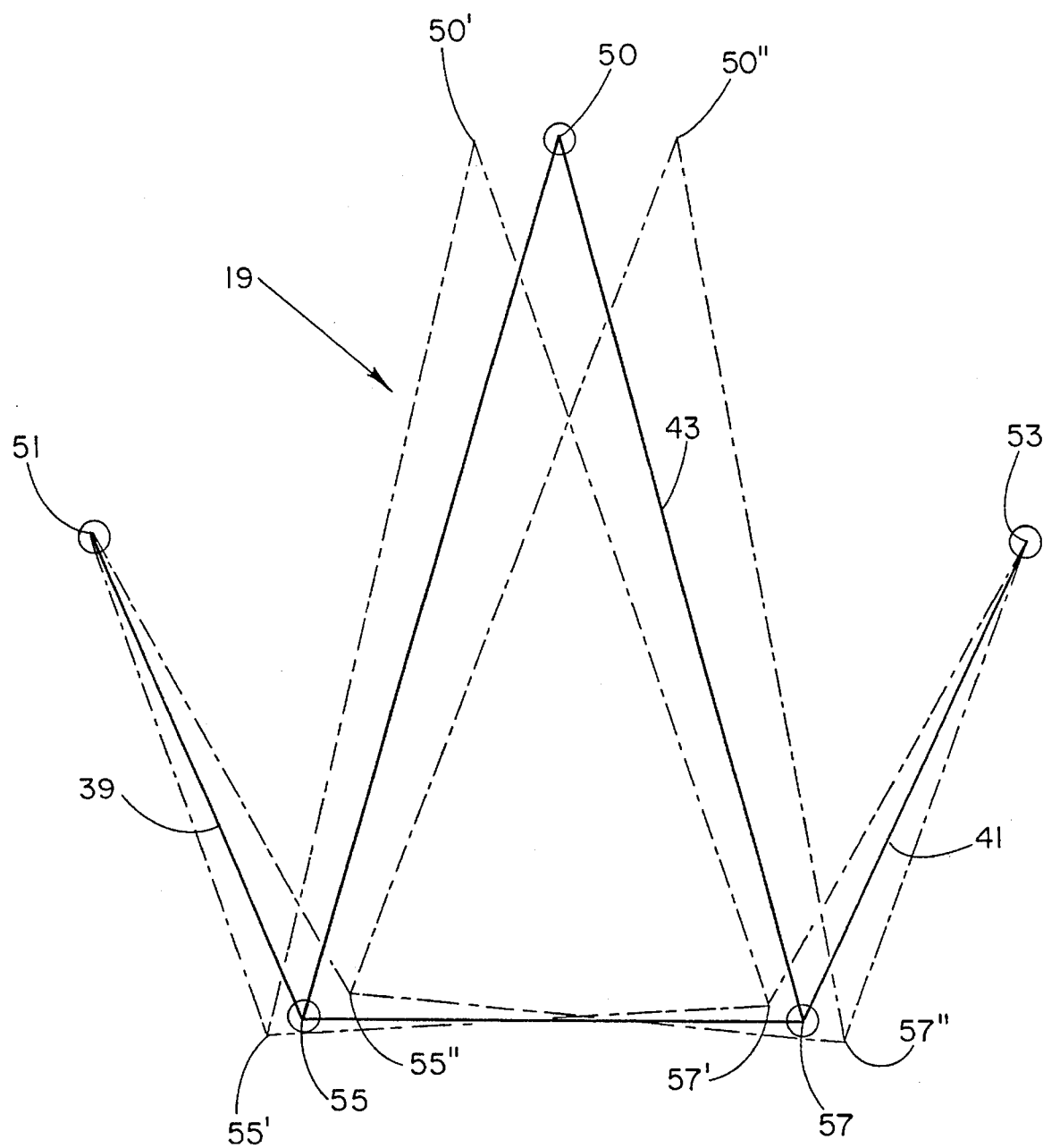
FIG. 7 is graphical representation of one of our straight-line linkage assemblies, showing the relative movement of each of the linkage arms as the material-conveying member reciprocates through a complete cycle.

With the construction of both the straight-line linkage pedestal support system and similar overhead suspension system having been described above, the operation and advantages of using such a straight-line linkage support system in lieu of a conventional pendular-type support system may now be more fully appreciated. To describe the operation of such a straight-line linkage assembly 19, a diagrammatic representation thereof is shown in FIG. 7, it being understood that all straight-line linkage assemblies described herein function in the same manner. In FIG. 7, the intermediate triangular portion drawn with solid lines represents the neutral position of rest of the intermediate conveyor supporting linkage arm 43 of a straight-line linkage assembly 19, with point 50 corresponding to the pivotal connection between arm 43 and the material-conveying member 5. Similarly, control links 39 and 41 are also represented in their neutral position of rest by solid lines extending upwardly and outwardly from pivotal connections 55 and 57 to pivotal connections 51 and 53, respectively. The phantom lines shown in FIG. 7 represent the relative movement of the linkage arms and pivotal connections of straight-line linkage assembly 19 during reciprocation of the material-conveying member 5.

As can be seen in FIG. 7, a forward (toward left) vibrational force on material-conveying member 5 causes control links 39 and 41 to pivot about fixed pivotal connections 51 and 53, respectively, in a clockwise direction. Such pivotal movement of control links 39 and 41 causes pivotal connection 55 to move forward and downward to point 55', and pivotal connection 57 to move forward and upward to point 57'. The resulting effect on intermediate conveyor supporting linkage arm 43 is a slight canting thereof in the forward direction, thereby causing pivotal connection 50 with material-conveying member 5 to slightly pivot and move along a substantially straight-line path to point 50'.

Upon application of a reverse (toward right) vibratory force to material-conveying member 5, control links 39 and 41 will pivot about pivotal connections 51 and 53, respectively, in a counterclockwise direction, thereby causing pivotal connection 55 to move rearward and upward to point 55", and causing pivotal connection 57 to move rearward and downward to point 57". Again, the resulting effect on intermediate conveyor supporting linkage arm 43 is a canting thereof in the rearward direction such that pivotal connection 50 with the material-conveying member 5 will pivot slightly in a clockwise direction and be displaced rearwardly along a substantially straight-line to point 50". The resulting motion of pivotal connection 50 between points 50' and 50", and consequently the material-conveying member 5, is along a non-pendular substantially straight-line path parallel to the path of conveyance of the material being conveyed thereby.

In order to obtain such non-pendular substantially straight-line motion of the material-conveying member 5, while restricting the overall size and dimension of each straight-line linkage assembly 18 or 19 to a small compass, it is desirable to adhere to certain parametrical relationships with respect to the length of the linkage arms and the distance between respective pivotal connections of the straight-line linkage assembly. It has been found that the most optimum motion approaching a straight line is obtained when the distance between pivotal connections 55 and 57 is approximately fifty-three to fifty-four percent (53–54%) of the distance between pivotal connections 51 and 53 of the straight-line linkage assembly, and pivotal connection 50 is displaced upwardly from the center line extending between pivotal connections 51 and 53. Also, for best results, the distance between pivotal connections 51 and 55 of control link 39, and the distance between pivotal connections 53 and 57 of control link 41 should be equal and preferably in the range of about fifty-five to fifty-six percent (55–56%) of the distance between pivotal connections 51 and 53.

In accordance with the above parameters, and with a view toward holding the size of such straight-line linkage assemblies to a small compass, in our preferred embodiment, the distance between pivotal connections 51 and 53 is approximately 8.063 inches, and the distance between pivotal connections 55 and 57 is about 4.313 inches. The length of control link 39 between pivotal connections 51 and 55, and the length of control link 41 between pivotal connections 53 and 57, is about 4.5 inches. Finally, the conveyor supporting linkage arm 43 extends upwardly such that pivotal connection 50, between support arm 43 and the material-conveying member 5, is disposed approximately 3.409 inches above the centerline between pivotal connections 51 and 53. Although the above dimensions are preferred, it should be understood that such dimensions may be adjusted without affecting the operation of the straight-line linkage assembly, so long as the above parametrical relationships as to the distances between the respective pivotal connections are maintained.

By maintaining the above parametrical relationships, it has been found that material-conveying member 5 will reciprocate along a straight-line plane of reciprocation parallel with the desired path of conveyance, with negligible displacement therefrom in a direction generally normal thereto. This is accomplished while limiting the total overall dimensions of the linkage assembly to only about 8.063 inches in width (point 51 to point 53) and 7.5 inches in height (point 50 to line adjoining points 55 and 57). The advantage and importance of being able to accomplish the above with a construction of such small compass will become more apparent hereinafter, as it will be shown that a comparable pendular-type support system for a conveyor would require a supporting arm of nearly 208 feet in length in order to maintain similar limitations of conveyor displacement in a direction generally normal to the desired path of conveyance.

Figure 8:
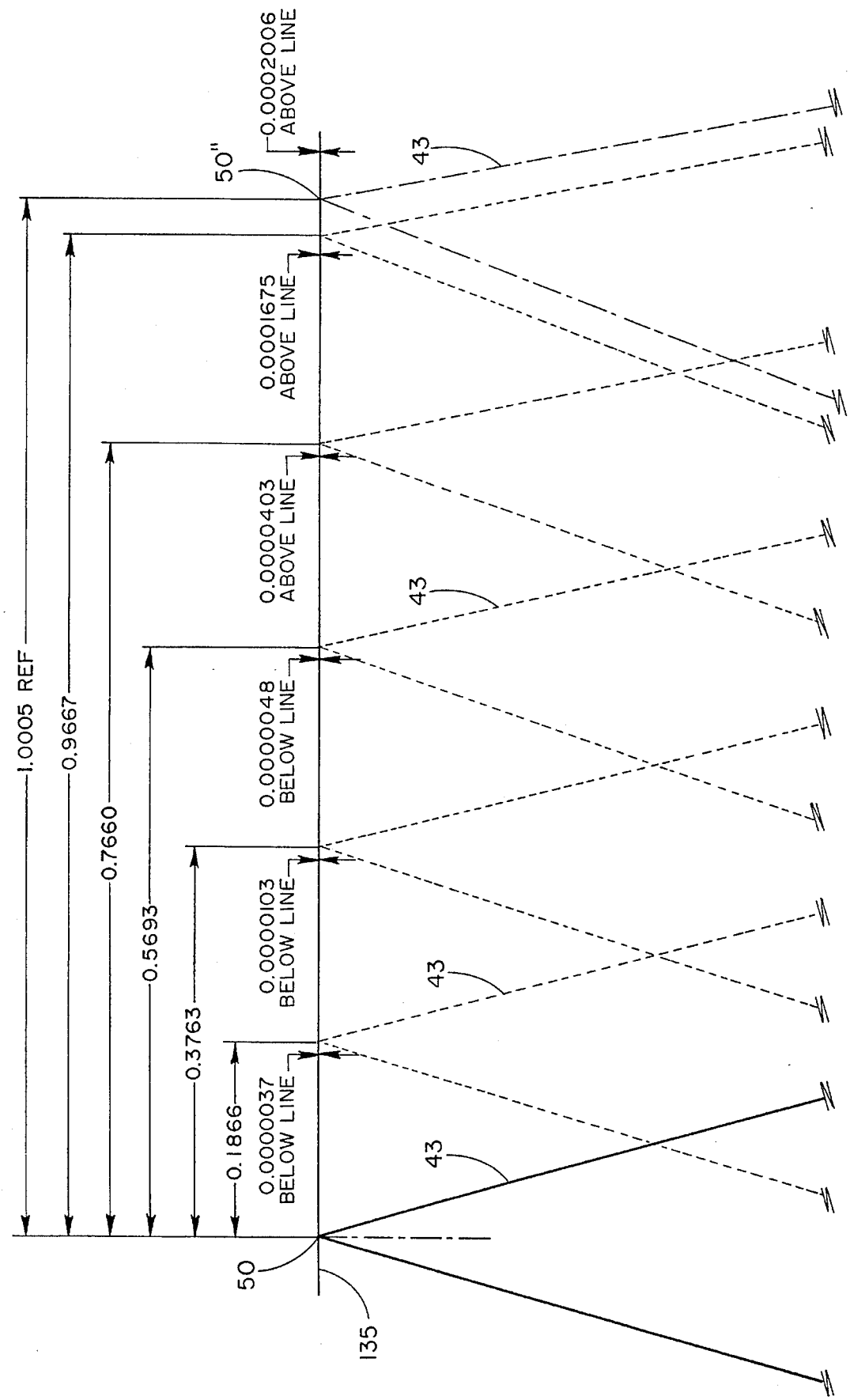
FIG. 8 is another graphical representation showing the movement of the pivotal connection between our straight-line linkage assembly and the material-conveying member, and consequently the material-conveying member itself, through a stroke of about one inch.

With reference now to FIG. 8, there is shown a plot of the movement of pivotal connection 50, and consequently material-conveying member 5, over a conveyor stroke of approximately one (1) inch in length. The material-conveying member 5 reciprocates along a straight-line plane of reciprocation 135 which extends parallel to the desired path of conveyance 7, with virtually negligible displacement therefrom. As shown in FIG. 8, movement of pivotal connection 50, and consequently material-conveying member 5, through a stroke distance of 1.005 inches from its central neutral position of rest, to point 50", only causes displacement of material-conveying member 5 in any one direction normal to the straight-line plane of reciprocation 135 a maximum distance of approximately $2 \times 10^{-4}$ inch.

At positions closer to the central neutral position of rest, such displacement of the material-conveying member 5 in a direction normal to the straight-line plane of reciprocation 135 is substantially less. For instance, at a distance of 0.5693 inch from the central neutral position of rest, the material-conveying member 5 is only about $4.8 \times 10^{-6}$ inch below the straight-line plane of reciprocation 135. At a distance of 0.766 inch from the central neutral position of rest, the material-conveying member 5 is only about $4.03 \times 10^{-5}$ inch above the straight-line plane of reciprocation 135. It is noted that motion of the material-conveying member 5 may be both above and below the straight-line plane of reciprocation 135 throughout each conveyor stroke, and follows a path which is non-pendular in nature.

By contrast, a pendulum-type support system, such as that shown in U.S. Pat. No. 5,131,525, previously disclosed, has substantial movement in a direction generally normal to the desired straight-line plane of reciprocation or path of conveyance. In such a conveyor system, the material-conveying member moves through a continuous arcuate swinging motion throughout the entire conveyor stroke, which necessarily introduces substantial movement in a direction normal to the desired straight-line path of conveyance. Such movement causes a number of undesirable effects, such as increased damage to the conveyed material, increased noise and dust, and structural damage to the supporting structure of the conveyor system.

By way of comparison, pendulum-type supports that are ten (10) feet in length and move through a stroke distance of only one (1) inch cause a displacement of the material-conveying member in a direction normal to a straight-line path of conveyance of approximately $4.17 \times 10^{-3}$ inch, which is a magnitude of twenty (20) times greater than that experienced through the use of our straight-line linkage support system. Pendulum-type supports of twenty (20) feet in length will cause a displacement normal to the desired path of conveyance of $2.09 \times 10^{-3}$ inch for a one (1) inch conveyor stroke, and pendulum-type supports of forty (40) feet in length will still cause such a displacement of $1.05 \times 10^{-3}$ inches. Even at forty (40) feet in length, the undesirable displacement of the material-conveying member in a direction normal to the desired straight-line path of conveyance is five (5) times greater than that which is found to exist through the use of our straight-line linkage support system. As stated above, it would require a pendulum-type support of approximately two hundred eight (208) feet in length to obtain the negligible levels of undesirable displacement of the material-conveying member which can be maintained by using our straight-line linkage assemblies.

The significance in the magnitude of difference in the undesirable displacement described above is best seen by considering the effects of such displacement on a typical conveyor system which reciprocates through a one (1) inch stroke (each direction) at four hundred (400) cycles per minute (cpm), and has a loaded weight of approximately five hundred (500) pounds at each support location. If ten (10) foot long pendulum-type supports are used for the material-conveying member, a displacement of about $4.17 \times 10^{-3}$ inches in a direction normal to the desired path of conveyance occurs, which translates to approximately nine (9) pounds of vibrational force being continually exerted upon the supporting structure at each support location. Thus, approximately 2% of the weight supported at each support location is continually pounding on the supporting structure at a high frequency during operation of the conveyor system.

Even with pendulum-type supports of twenty (20) feet in length, in a conveyor system operating at 400 cpm, the vibrational force in a direction normal to the desired path of conveyance is in excess of four (4) pounds at each support location of the material-conveying member. Even reducing the speed at which such a conveyor system operates to the relatively low speed of 200 cpm does not alleviate the problem, as the vibrational force which is generated by movement of the material-conveying member in a direction normal to the desired path of conveyance is still in excess of one (1) pound at each support location therefor. Such continued pounding on the supporting structure eventually causes deterioration thereof.

By contrast, the same conveying system operating at 400 cpm and utilizing our straight-line linkage support system will only generate about 0.45 pounds of force in a direction normal to the desired path of conveyance. This is less than one-tenth of one percent (0.1%) of the total weight of the material-conveying member at each support location, which is a significant improvement over a conventional pendulum-type support which repeatedly transfers nearly two percent (2%) of the total weight of the material-conveying member to each support location (in excess of twenty times [20x] that of our support).

For ease of comparison, set forth in Table I below are the approximate values of force, represented in percentage of total weight of the material-conveying member at each support location, which is generated in a direction normal to the desired path of conveyance as a result of the relative movement of the material-conveying member. Values for both our straight-line linkage support and for pendulum-type supports in lengths of ten (10) feet, twenty (20) feet and forty (40) feet are shown. The data in Table I has been calculated for conveyor systems operating at 200 cpm, 400 cpm and 600 cpm.

TABLE I

|  | (% of weight of material-conveying member) | | | |
| --- | --- | --- | --- | --- |
|  | Straight line | 10 ft. pend. | 20 ft. pend. | 40 ft. pend. |
| 200 cpm | .02 | .47 | .24 | .12 |
| 400 cpm | .09 | 1.82 | .95 | .48 |
| 600 cpm | .20 | 4.26 | 2.14 | 1.07 |

As can be seen from Table 1, under similar operating conditions, the straight-line linkage assembly is a significant improvement over a pendulum-type support system, even when the pendulum-type supports are in excess of 40 feet in length, which is obviously impractical. As stated previously, the pendulum supports would have to be over 208 feet long in order to approach the operating characteristics of our straight-line linkage assembly which, as stated previously, is only about 7.5 inches in length. The significant reduction in the amount of force which is generated in a direction normal to the desired path of conveyance markedly reduces the operating noise level of such a conveyor system, and substantially reduces the amount of damage to the conveyed product and the amount of airborne particles which are emitted therefrom. Most importantly, however, the deterioration of the supporting structure for such a conveyor system is significantly reduced as a result of a substantial reduction of force which is transferred thereto at each support location of the material-conveying member. Through the use of our straight-line linkage assembly, movement of the material-conveying member may be maintained along a straight-line plane of reciprocation which is parallel to the desired path of conveyance, with negligible displacement thereof in directions generally normal thereto. By adhering to the above parametrical relationships with respect to the dimensions of the respective linkage arms in each straight-line linkage assembly, the linkage assembly can be constructed of small compass so as to economize space utility and reduce the cost of manufacturing the same.

It will, of course, be understood that various changes may be made in the form, details, arrangement and proportions of the parts without departing from the scope of the invention which comprises the matter shown and described herein and set forth in the appended claims.

I claim:

1. A conveyor system having support apparatus for maintaining substantially straight-line motion of the material-conveying member of the conveyor, comprising:
   (a) a vibrating conveyor defining a substantially straight-line path of conveyance and having a material-conveying member which reciprocates in non-pendular motion along a straight-line plane of reciprocation substantially parallel with said path of conveyance;
   (b) force generating mechanism connected to said material-conveying member for transmitting conveying forces thereto to cause said reciprocation along said straight-line plane of reciprocation;
   (c) rigid support means for supporting said material conveying member in movable relation relative to a supporting surface, the distance between said supporting surface and said material-conveying member being less than 10 feet; and
   (d) said rigid support means including at least one set of a plurality of pivotally interconnected rigid and inflexible arms which are pivotally connected between said material-conveying member and said supporting surface, each said set of a plurality of arms being connected to said material-conveying member at a single point, and being constructed and arranged to maintain non-pendular movement of said material-conveying member only in a single general plane substantially parallel with said plane of reciprocation.

2. The structure defined in claim 1, wherein each said set of a plurality of arms includes resilient biasing means for urging said material-conveying member to return to a central position of rest.

3. The structure defined in claim 1, wherein pivotal connections are formed between said interconnected arms, between said arms and said material-conveying member, and between said arms and said supporting surface, at least some of said pivotal connections including a resilient bushing for controlling pivotal movement of said support means.

4. The structure defined in claim 3, wherein each resilient bushing is comprised of an inner sleeve and an outer casing with an elastomeric material disposed in secure fixed relation therebetween, thereby providing resilient movement of said outer casing relative to said inner sleeve.

5. The structure defined in claim 1, wherein each set of a plurality of arms includes first and second opposing arms having opposite terminal end portions, and a third interconnecting arm disposed therebetween, one of said end portions of each of said first and second arms being spaced apart and pivotally connected to said supporting surface, and said other opposite end portion of each of said first and second arms being spaced apart and pivotally connected to said third arm, said third arm being pivotally connected to said material-conveying member, thereby defining a plurality of pivotal connections between said material-conveying member and said supporting surface.

6. The structure defined in claim 5, wherein the distance between said pivotal connections disposed at opposite said end portions of said first arm, and the distance between said pivotal connections disposed at opposite said end portions of said second arm, is less than fifty-eight percent of the distance between said pivotal connection of said first arm to said supporting surface and said pivotal connection of said second arm to said supporting surface.

7. The structure defined in claim 5, wherein the distance between said pivotal connections disposed at opposite said end portions of said first arm, and the distance between said pivotal connections disposed at opposite said end portions of said second arm, is within the approximate range of fifty-five to fifty-six percent of the distance between said pivotal connection of said first arm to said supporting surface and said pivotal connection of said second arm to said supporting surface.

8. The structure defined in claim 1, wherein each said set of a plurality of arms is constructed and arranged to restrict movement of said material-conveying member, in a direction generally normal to said plane of reciprocation, to less than 0.001 inch for one inch of movement of said material-conveying member along said plane of reciprocation.

9. The structure defined in claim 1, wherein each said set of a plurality of arms is constructed and arranged to restrict movement of said material-conveying member in a direction generally normal to said plane of reciprocation, whereby the maximum vibratory force transmitted through said support means to said supporting surface by said material-conveying member is less than 0.2 per cent of the weight of said material-conveying member supported by said support means.

10. A conveyor system having a support apparatus for restricting the material-conveying member of the conveyor to substantially straight-line motion, comprising:

(a) a vibrating conveyor defining a substantially straight-line path of conveyance and having a material-conveying member which reciprocates in non-pendular motion along a straight-line plane of reciprocation substantially parallel with said path of conveyance;

(b) means connected to said material-conveying member for generating and transmitting vibratory forces to said material-conveying member to cause said reciprocation thereof;

(c) rigid support means for supporting said material conveying member in movable relation relative to a supporting surface, the distance between said supporting surface and said material-conveying member being less than 40 feet; and (d) said rigid support means including straight-line linkage connected between said material-conveying member and said supporting surface which is constructed and arranged to restrict movement of said material conveying member, in a direction generally normal to said plane of reciprocation, to less than 0.001 inch for one inch of movement of said material conveying member along said plane of reciprocation.

11. The structure defined in claim 10, wherein said straight-line linkage includes at least one set of a plurality of pivotally interconnected rigid and inflexible arms which are pivotally connected between said material-conveying member and said supporting surface, each said set of a plurality of arms being pivotally connected to said material-conveying member at a single point, thereby providing a plurality of pivotal connections disposed between said material-conveying member and said supporting surface.

12. The structure defined in claim 10, wherein said straight-line linkage is constructed and arranged such that the weight of said material-conveying member continually urges said straight-line linkage and said material-conveying member toward a neutral position of rest.

13. The structure defined in claim 11, wherein at least some of said pivotal connections include a resilient bushing for controlling pivotal movement of said support means, each said resilient bushing comprising an inner sleeve and an outer casing with an elastomeric material disposed in secure fixed relation therebetween, thereby providing resilient movement of said outer casing relative to said inner sleeve.

14. The structure defined in claim 11, wherein each set of a plurality of arms includes first and second opposing arms having opposite terminal end portions, and a third interconnecting arm disposed therebetween, one of said end portions of each of said first and second arms being spaced apart and pivotally connected to said supporting surface, and said other opposite end portion of each of said first and second arms being spaced apart and pivotally connected to said third arm, said third arm being pivotally connected to said material-conveying member, thereby defining said plurality of pivotal connections between said material-conveying member and said supporting surface.

15. The structure defined in claim 14, wherein the distance between said pivotal connections disposed at opposite said end portions of said first arm, and the distance between said pivotal connections disposed at opposite said end portions of said second arm, is less than fifty-eight percent of the distance between said pivotal connection of said first arm to said supporting surface and said pivotal connection of said second arm to said supporting surface.

16. The structure defined in claim 14, wherein said third interconnecting arm is longer than said first and second arms.

17. The structure defined in claim 14, wherein the distance between said pivotal connection of said third arm to said material-conveying member, and said pivotal connection of either of said first or second arms to said third arm, is longer than the distance between said pivotal connections at opposite said end portions of said first arm, and longer than the distance between said pivotal connections at opposite said end portions of said second arm.

18. A conveyor system having a support apparatus for restricting the material-conveying member of the conveyor to substantially straight-line motion, comprising:

(a) a vibrating conveyor having a material-conveying member which reciprocates in non-pendular motion along a straight-line plane of reciprocation at a speed of reciprocation of not less than 200 cycles per minute;

(b) means connected to said material-conveying member for generating and transmitting vibratory forces to said material-conveying member to cause said reciprocation thereof;

(c) rigid support means for supporting said material conveying member in movable relation relative to a supporting surface, the distance between said supporting surface and said material-conveying member being less than 20 feet; and (d) said rigid support means including straight-line linkage connected between said material-conveying member and said supporting surface, said linkage restricting movement of said material-conveying member in a direction generally normal to said plane of reciprocation such that the maximum vibratory force transmitted through said support means to said supporting surface by said material conveying member is less than a 0.2 per cent of the weight of said material-conveying member supported by said support means.

19. The structure defined in claim 18, wherein said straight-line linkage is constructed and arranged such that the weight of said material-conveying member continually urges said straight-line linkage and said material-conveying member toward a neutral position of rest.

20. The structure defined in claim 18, wherein said straight-line linkage includes at least one set of a plurality of pivotally interconnected rigid and inflexible arms which are pivotally connected between said material-conveying member and said supporting surface, each said set of a plurality of arms being pivotally connected to said material-conveying member at a single point, thereby providing a plurality of pivotal connections disposed between said material-conveying member and said supporting surface.

21. The structure defined in claim 20, wherein at least some of said pivotal connections include a resilient bushing for controlling pivotal movement of said support means, each said resilient bushing comprising an inner sleeve and an outer casing with an elastomeric material disposed in secure fixed relation therebetween, thereby providing resilient movement of said outer casing relative to said inner sleeve.

22. The structure defined in claim 20, wherein said arms of said straight-line linkage are constructed and arranged such that movement of said material-conveying member in a direction generally normal to said plane of reciprocation is restricted to less than 0.001 inch for one inch of movement of said material-conveying member along said plane of reciprocation.

\* \* \* \* \*